United States Patent
Triffo et al.

(10) Patent No.: US 12,327,488 B2
(45) Date of Patent: Jun. 10, 2025

(54) DEVICE AND METHOD FOR SEXUAL EDUCATION AND TRAINING

(71) Applicants: Dyan Triffo, San Francisco, CA (US); Gunther Haller, Mill Valley, CA (US)

(72) Inventors: Dyan Triffo, San Francisco, CA (US); Gunther Haller, Mill Valley, CA (US)

(*) Notice: Subject to any disclaimer, the term of this patent is extended or adjusted under 35 U.S.C. 154(b) by 594 days.

(21) Appl. No.: 17/549,067

(22) Filed: Dec. 13, 2021

(65) Prior Publication Data

US 2023/0186789 A1    Jun. 15, 2023

(51) Int. Cl.
G09B 23/30     (2006.01)
G01N 27/04     (2006.01)
G01N 27/22     (2006.01)

(52) U.S. Cl.
CPC .......... *G09B 23/30* (2013.01); *G01N 27/045* (2013.01); *G01N 27/228* (2013.01)

(58) Field of Classification Search
CPC ........ G09B 23/28; G09B 23/30; G01N 27/04; G01N 27/045; G01N 27/22; G01N 27/228
See application file for complete search history.

(56) References Cited

U.S. PATENT DOCUMENTS

| | | | |
|---|---|---|---|
| 2004/0122287 A1* | 6/2004 | Minigh | G09B 23/30 600/38 |
| 2012/0034587 A1* | 2/2012 | Toly | G09B 23/30 434/267 |
| 2014/0011172 A1* | 1/2014 | Lowe | G09B 23/288 434/273 |
| 2016/0104394 A1* | 4/2016 | Miyazaki | G09B 23/34 434/272 |
| 2020/0268596 A1* | 8/2020 | Shubin, Sr. | B29C 45/26 |

* cited by examiner

*Primary Examiner* — Timothy A Musselman (57) ABSTRACT

A system for teaching users techniques to sexually satisfy a woman, wherein a device shaped as a woman's pelvic area with sensors installed thereon is used to train users on the proper way to stimulate a woman's genital area. An external device in communication with the device shaped like the pelvic area receives the sensor data and informs the user as to whether prestored known sexual techniques were correctly implemented by the user.

18 Claims, 7 Drawing Sheets

DEVICE AND METHOD FOR SEXUAL EDUCATION AND TRAINING

1. FIELD OF THE INVENTION

The current invention is a sexual educational training system, in particular one that can be used to teach individuals how to pleasure (by finger and orally) a woman's pelvic, and additionally anal, regions, both internally via penetration and externally via touching.

2. BACKGROUND

Sexual satisfaction is one of the most sought-after things in many people's lives and society in general. The desire for sexual satisfaction and has spawned multi-billion dollar industries such as the fashion industry, pornography (and movie and television) industry, wellness/spa industry and the advertising industry.

However, the manner by which women achieve sexual pleasure is often misunderstood, it is not generally taught in schools (even in sexual education classes), and discussion of the necessary issues are often socially awkward, especially among parents and their children who are coming of age. As an unfortunate consequence, individuals are often left to receiving uneducated and/or random tips from friends or viewing pornography to learn about the bodies of the opposite sex. In particular, individuals seeking to learn how to please their partners by viewing pornography tend to be misled by the inaccurate portrayals of encounters which often demean and glorify sexual encounters involving women in a completely unrealistic manner.

Recent studies have confirmed a powerful connection between sexual satisfaction and brain activity in women. More specifically, the key hormones and neurotransmitters involved in female sexual pleasure have a direct relationship to female confidence, creativity and connection to vitality. Nonetheless, the methods to pleasure a woman are vastly misunderstood and there is a serious need to educate both pleasure providers and pleasure receivers as to the vast and varied amounts and types of pleasure that a woman can receive.

Women are built for pleasure with three neural pleasure networks as compared to a man's one. In addition, woman have an estimated 80,000 nerve endings dedicated to pleasure as opposed to an estimated 20,000 in a man. Yet the current limited approach to sex education focuses heavily on male pleasure as well as on sex as a penetrative act. This approach does not take into consideration that only an estimated 20 to 25 percent of women experience orgasm from penetrative sex alone. And that many women need an average of 20 minutes of direct stimulation in order to be in a receptive orgasmic state. This lack of understanding about how to pleasure a woman leads to a lack of interest in sex from women and contributes to a massive orgasm gap between men and women. Helping partners understand how to pleasure a woman and also teaching a woman the full range of pleasure available to her, would increase sexual desire overall, increasing intimacy, connectedness and vitality, and provide exercise and tension release.

DESCRIPTION OF THE PRIOR ART

While a variety of products have been developed to enhance sexual pleasure, none have focused specifically on educating users as to how to pleasure a woman. The prior art mainly consists of "sex toys" which are devices designed to be inserted into the sex organs or massage/vibrate on the sex organs.

There is a great need for proper and detailed instruction on methods to actually stimulate a woman with intimacy, such as using hands and oral methods, which advantageously stimulates the woman's natural pleasure receptors. Doing so successfully will lead to a more sexually satisfied and vital population overall, improved happiness, improved health and improved relationships.

BRIEF DESCRIPTION OF THE INVENTION

This invention is a sexual educational training system designed to teach individuals how to pleasure (by finger and/or tongue) a woman's pelvic (and additionally anal) regions, both internally and externally.

The user, in this case a person seeking to pleasure a woman (called pleasure provider herein) is provided with detailed instructions on how to interact with a female's pelvic or anal area. The detailed instructions can be in the form of a booklet, electronic on an application or ebook, or via other means such as by audio/voice over a speaker or cellular smartphone. In addition, instructional videos can be displayed to the user, either from the internet or from a smartphone application.

The inventive system further consists of a base device (the "anatomical device") which is a life-size or near life size replica of a woman's internal and external pelvic region (with an anal region either included or available as an add-on). The anatomical device includes sensors throughout that simulate the various nerve endings in a woman's anatomy. These sensors will detect a user's interaction with the anatomical device. For example, one or more of the shape, pressure and speed of motion applied by fingers and/or tongue. The sensors relay this information to a microprocessor and then to a software application which may run on a smart device (including a smartphone or cellular phone), computer or other remote device.

A user would then attempt to carry out the detailed instructions on the anatomical device. The system will detect one or more of the shape, pressure and speed of the user's motions and provide feedback by comparing these metrics to a set of desired preprogrammed stored stimulations that match with the instructions. Thus, the user will know whether the instructions are being followed correctly. The system may then direct the user as to how to improve the movements to more a accurately achieve the suggested technique.

DETAILED DESCRIPTION OF THE INVENTION

Figure 1:
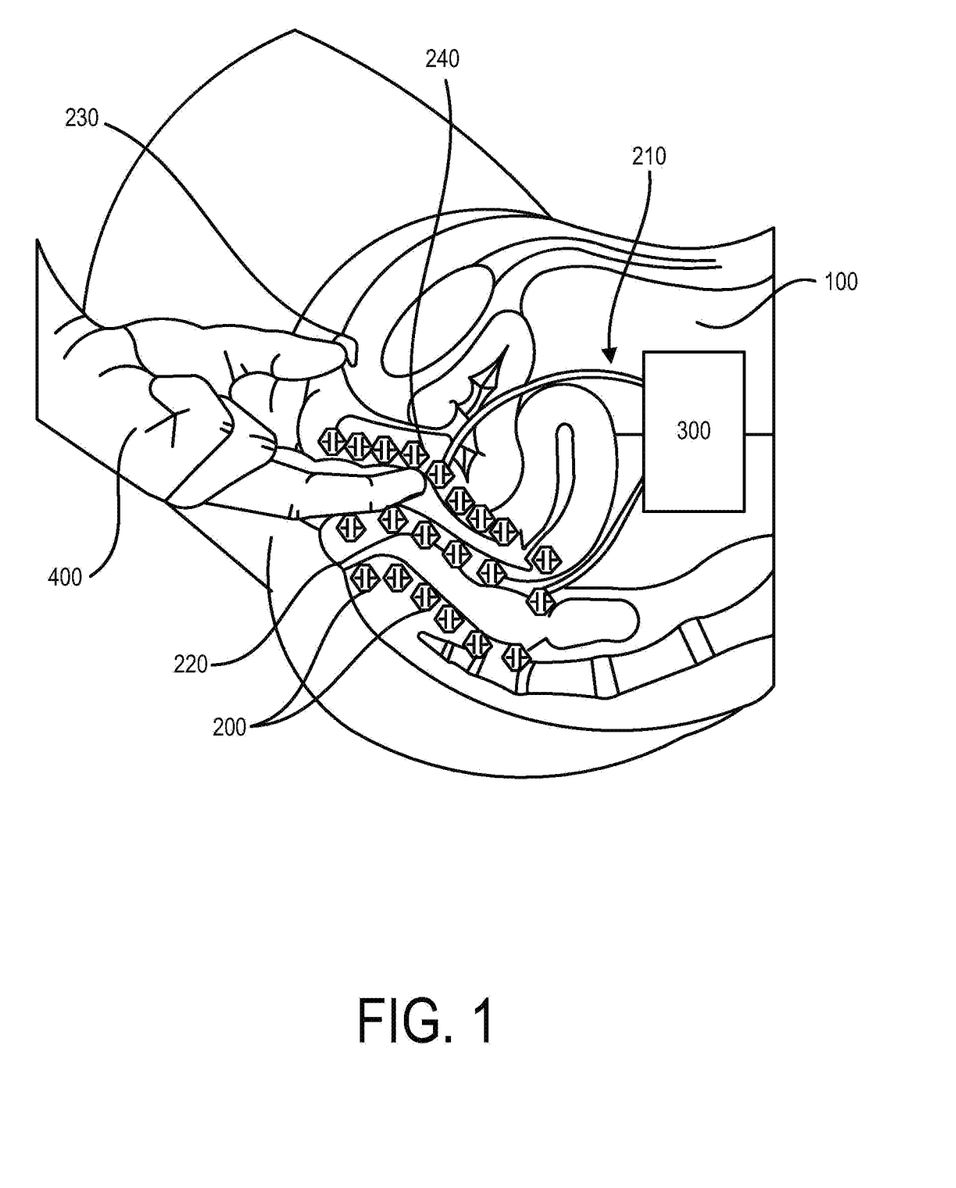
FIG. 1 is a cutaway side perspective view of anatomical device 100 according to the invention.

Without restricting the full scope of this invention, the preferred form of this invention is illustrated in the following drawings:

FIG. 1 shows a cutaway view of the anatomical device 100 that is generally shaped to resemble a woman's pelvic region. Many sensors 200 are deposed within the anatomical device 100 to detect interaction with a user. The sensors 200 are connected to a Signal Processing Board (SPB) 300 via wires 210. The processing board 300 is shown placed internally in the anatomical device 100, but may be attached to the exterior if desired. There are preferably between 10 and 50 sensors, but there is no lower or upper limit to the number of sensors that can be employed.

The anatomical device 100 may be made of a silicone or ThermoPlastic Elastomers (TPE) like Liquid Silicone Rubber (LSR) or similar material.

Sensors are distributed throughout the pelvic region of anatomical device 100 both internally and externally. Sensors, for example, cover the areas of the Anus 220, clitoris, 230 and the sensitive G spot 240. The hand 400 of a user/pleasure provider is shown inserted into the pelvic region touching areas 230 and 240 simultaneously. Alternatively, the user may touch the anatomical device 100 using oral methods such as the tongue.

The sensors may cover areas corresponding to a woman's sensitive regions such as the vulva, vagina, labia majora, labia minora, hymen, perineum, urethra, clitoris, cervix, inside walls, A-spot, O-spot, etc. The sensors may be based on resistive or capacitive technology, or any other technology detecting touches and pressures. Examples of sensors are piezo-resistive or capacitive sensors such as, MEMS sensors, textile pressure sensors. Other sensor examples are sensors available as FlexiForce A201 Sensor from www.tekscan.com (Tekscan), or bare conductive printed sensors.

There are many ways to integrate items as sensors into silicone or rubber, as known by those of ordinary skill in the art. One example is: Schotzko, Timo & Reuter, Mark & Lang, Walter. (2015) Sensor integration in rubber gaskets for structural health monitoring made by compression molding, Polymer Testing. 48, 31-36; 10.1016/j.polymertesting.2015.09.002, BOOK Schotzko, Timo 2016/03/01 SN 978-3-8439-2499-3 SENSOR INTEGRATION IN SILICONE AND RUBBER GASKETS FOR STRUCTURAL HEALTH MONITORING (SHM), incorporated herein by reference.

Figure 2:
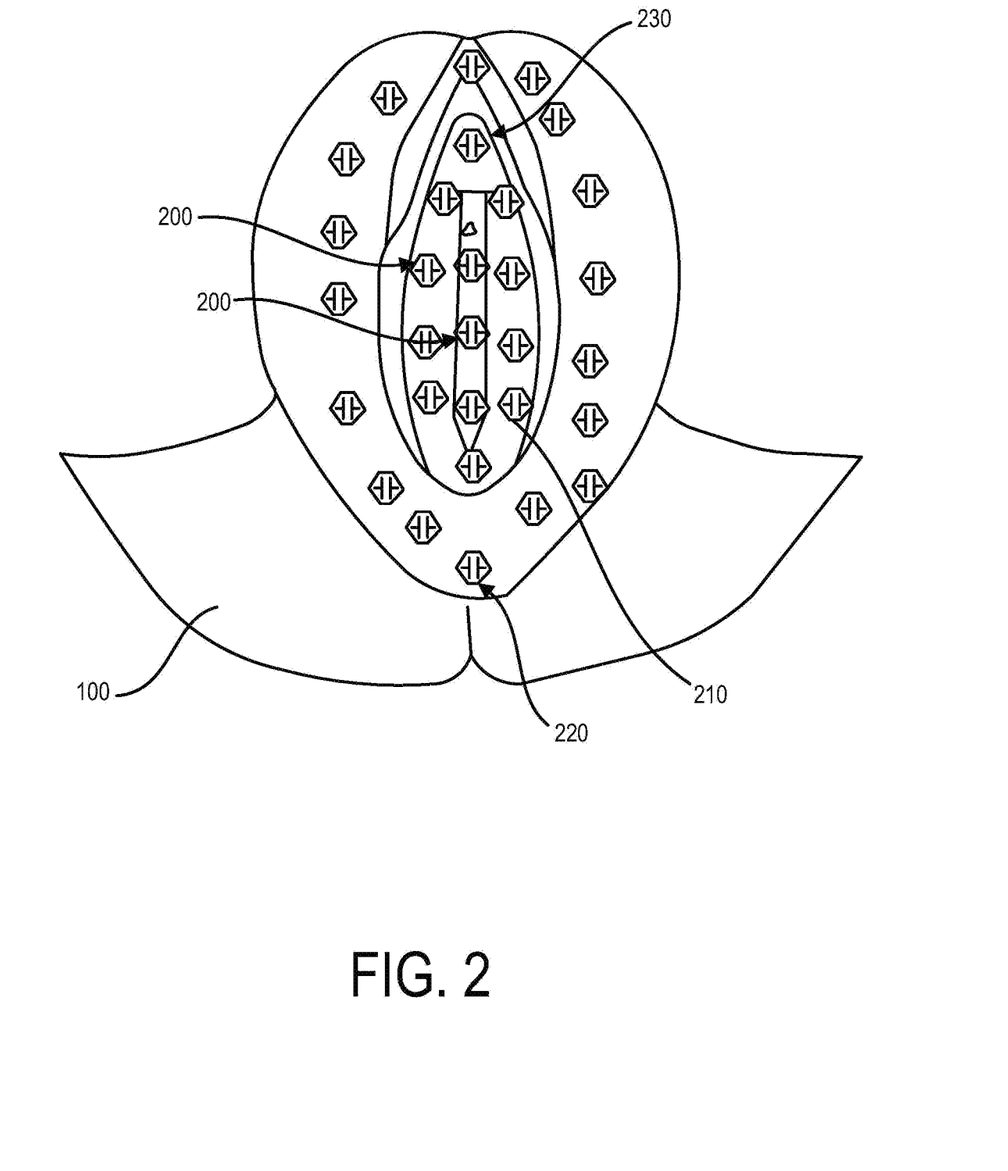
FIG. 2 is a front view of the anatomical device according to the invention.

FIG. 2 shows a frontal view of the anatomical device 100 looking directly at the exterior of the pelvic region. Sensors 200 are distributed on or very near the surface to detect a user's interaction, and wires 210 communicate with the processing board 300 (not shown). Sensors cover the anatomical areas subject to touching, for example clitoris 230 and anus 220.

The sensors 200, 220, 230 may be any suitable pressure sensors, proximity sensors, or other sensors known in the art. The wires 210 may be preattached to the sensors when the anatomical device is formed or placed within it after formation.

Figure 3:
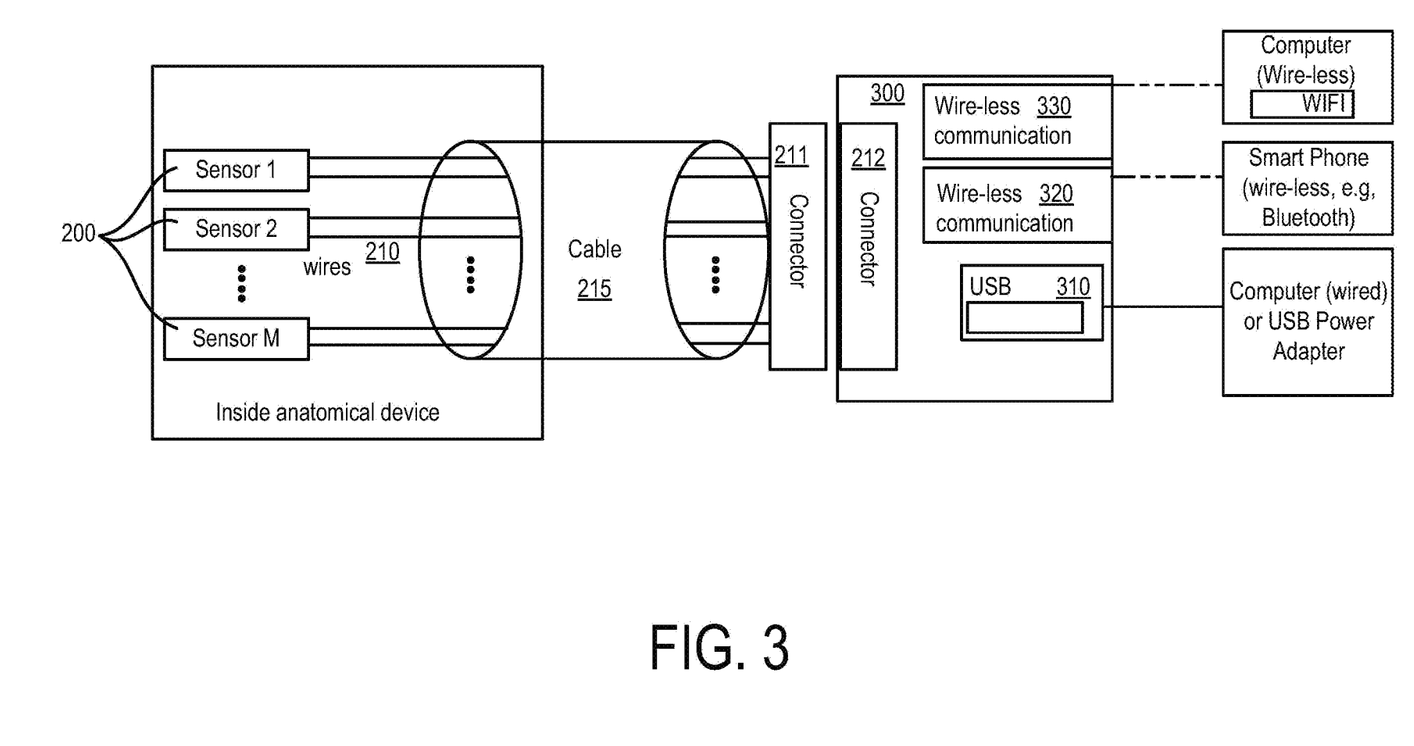
FIG. 3 is an electrical system block diagram.

FIG. 3 shows an exemplary block diagram of the electrical system, including the electrical connections between sensors 200 and the processing board 300. Wires 210 carry the signals to a connector 211 mating with another connector 212 on the processing board 300. This enables the processing board 300 to be removable for purpose of repair or upgrade. The processing board 300 has the capability to communicate to other external devices, for example it may have a USB port 310, a wireless Bluetooth transceiver 320 or wireless Wifi or other transceiver 330. Any known wireless (or wired) transmission protocol or existing chipset(s) could be utilized, including ethernet.

While wires 210 are shown as as part of cable 215, another connector set 211/212 could be used inside the anatomical device. The cable 215 power (if necessary) to the M sensors 200 and carries data to/from the M sensors 200.

As stated previously, the processor board 300 may be located internal to the anatomical device or external. If located internal to the anatomical device 100 it may have external connectors such as a USB connector connected to USB transceiver 310 exposed for external connectivity. Alternatively an internal power source such a rechargeable battery (not shown) may power the processor board 300.

Figure 4:
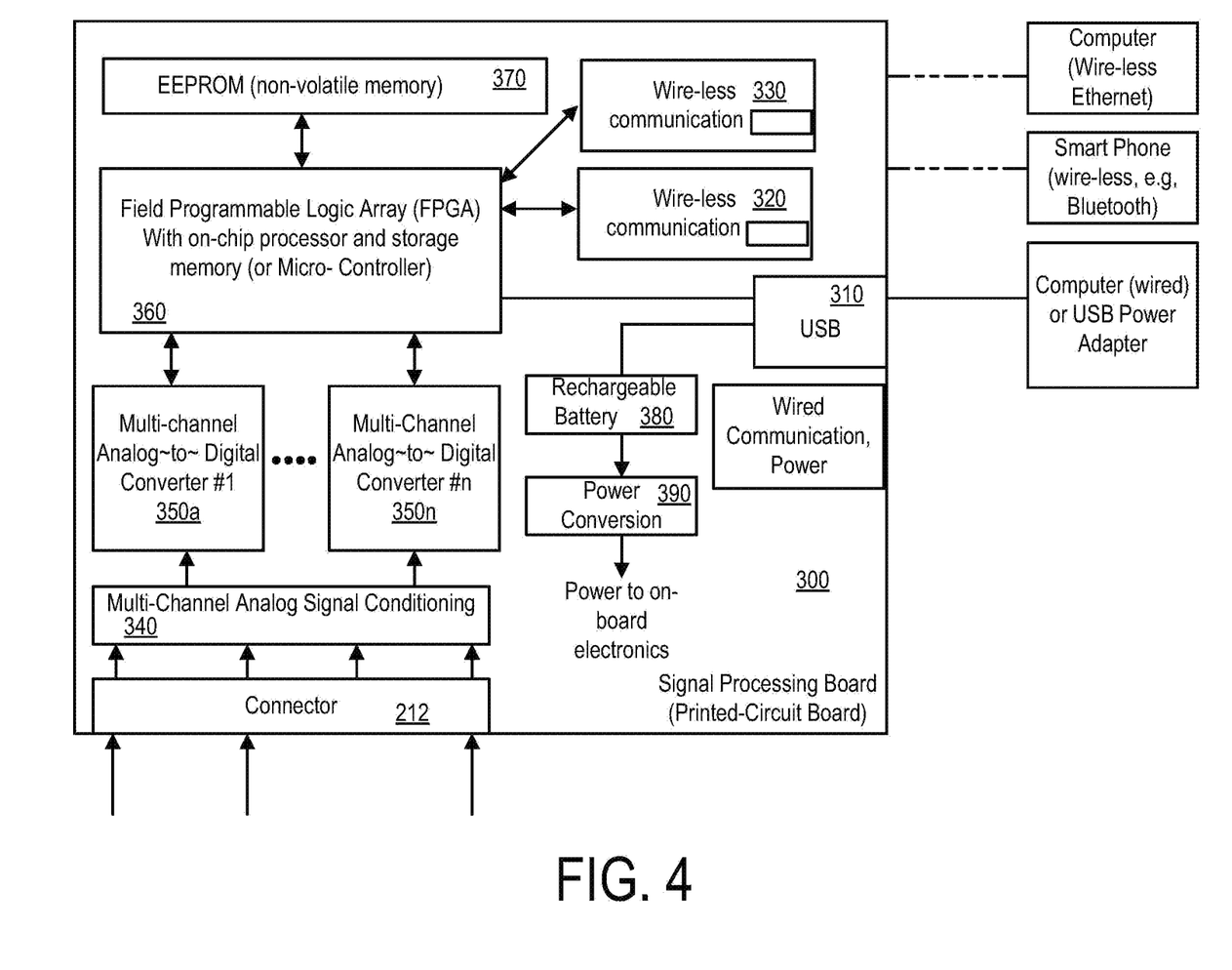
FIG. 4 is a block diagram of the processing board 300 of FIG. 1.

FIG. 4 shows the components preferably on the processor board 300. These include communication wired transceivers such as USB transceiver 310, wireless transceivers 320, 330 and sensor connector 212, previously mentioned.

The sensors 200 send signals to the connector 212, then through a multi channel analog signal condition unit 340 for receiving the many sensor signals. The analog signals then pass through one or more analog to digital converters 350a to 350n, which provide digital signals to a processor 360. This may include the Analog Devices AD7147A. The processor may be a field programmable logic array (FPGA) or a microprocessor/microcontroller. Non-volatile memory 370 is in communication with the processor to provide it storage and operating instructions. This may be EEPROM, FLASH or other non-volatile memory as known in the art. The processor 360 may also use RAM or volatile memory (not shown) as is well known to execute the instructions provided by non-volatile memory.

These components on the processor board are powered by a power circuit 390 providing the correct voltages to the on-board components. The power circuit 390 is connected to a source of power such as a rechargeable battery 380 or wired power source such as USB connector 310 (or both as shown).

The processor 360 and its associated software detect the sensor signals, perform any necessary signal conditioning and relay the resulting data to an external device such as a smartphone or personal computer, via Bluetooth or USB or other known protocols and communication techniques. The external device has stored therein information on sexual techniques and compares the sensed information with the prestored information to determine how close the user is to performing a sexual technique accurately. It also may display other information that is sensed, such as speed and pressure, described below.

Figure 5:
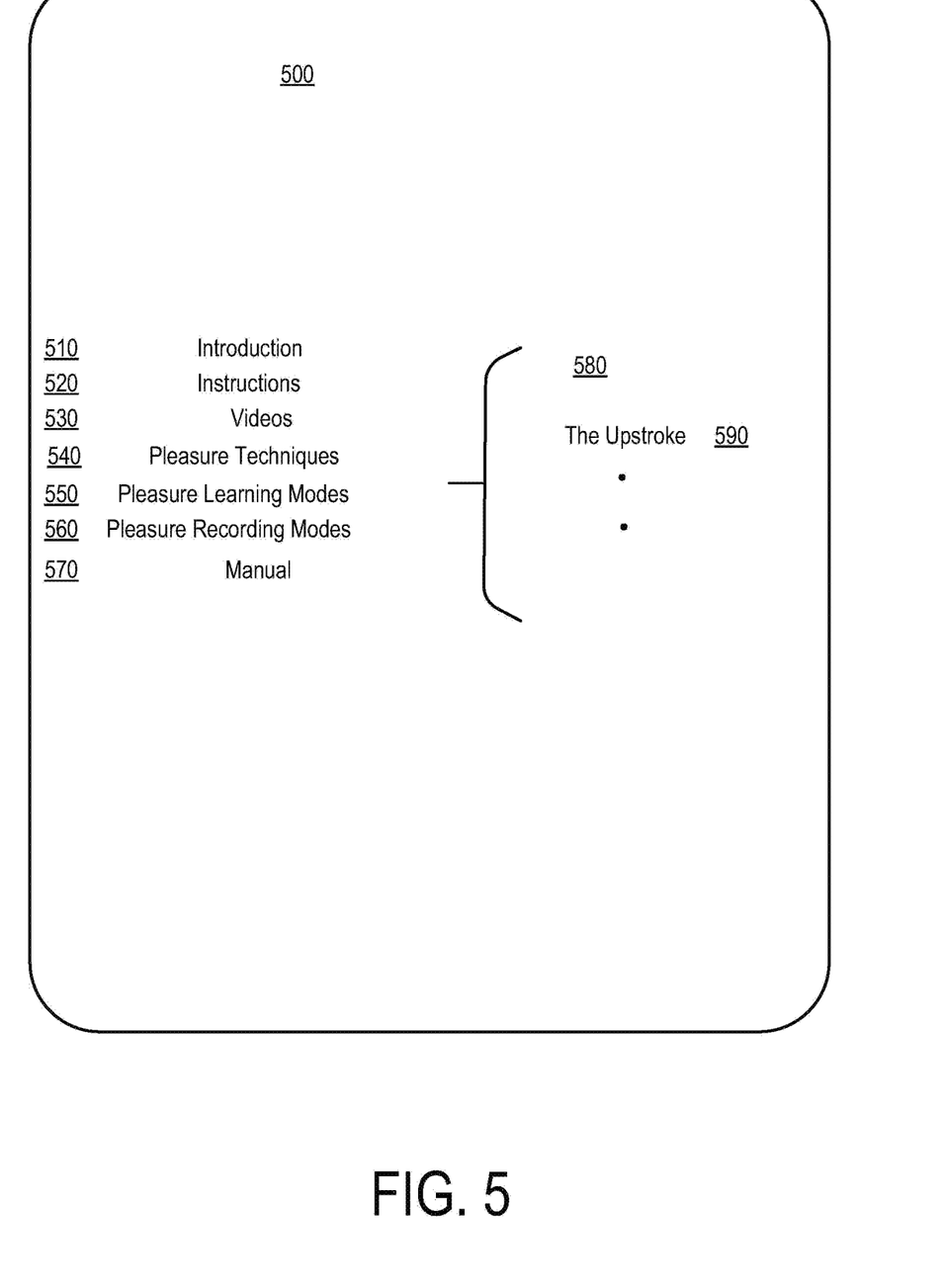
FIG. 5 is a screen layout example for a smartphone application used in the present invention.

As stated previously, the anatomical device may be in communication with an external device, such as a smartphone running an application developed for the anatomical device. The external device may also be a computer or any other computing device such as a tablet, smart television or dongle. An example of a screen of the application is shown in FIG. 5. This screen 500 asks the user to select from a number of options.

Introduction screen 510 shows general introductions what the user can do and what the capability of the device s.

Instruction screen 520 shows options for receiving instructions on how to please a woman in accordance with the present invention.

Videos screen 530 shows videos of visual indications of the areas and spot and what movements are suggested.

Pleasure Techniques screen 540 explains itemized ways how to pleasure a woman.

Pleasure learning modes screen 550 shows a number of pleasure techniques 580 that can be learned by the user, such as "the upstroke" 590.

Pleasure sensing and recording modes are shown from screen 560.

Manual screen 570 shows a manual or user guide for operating the software.

Assuming the user selects pleasure learning mode 560, a number of options are presented for specific techniques pleasurable to a woman 570. One of these may be "the upstroke" 580.

Figure 6:
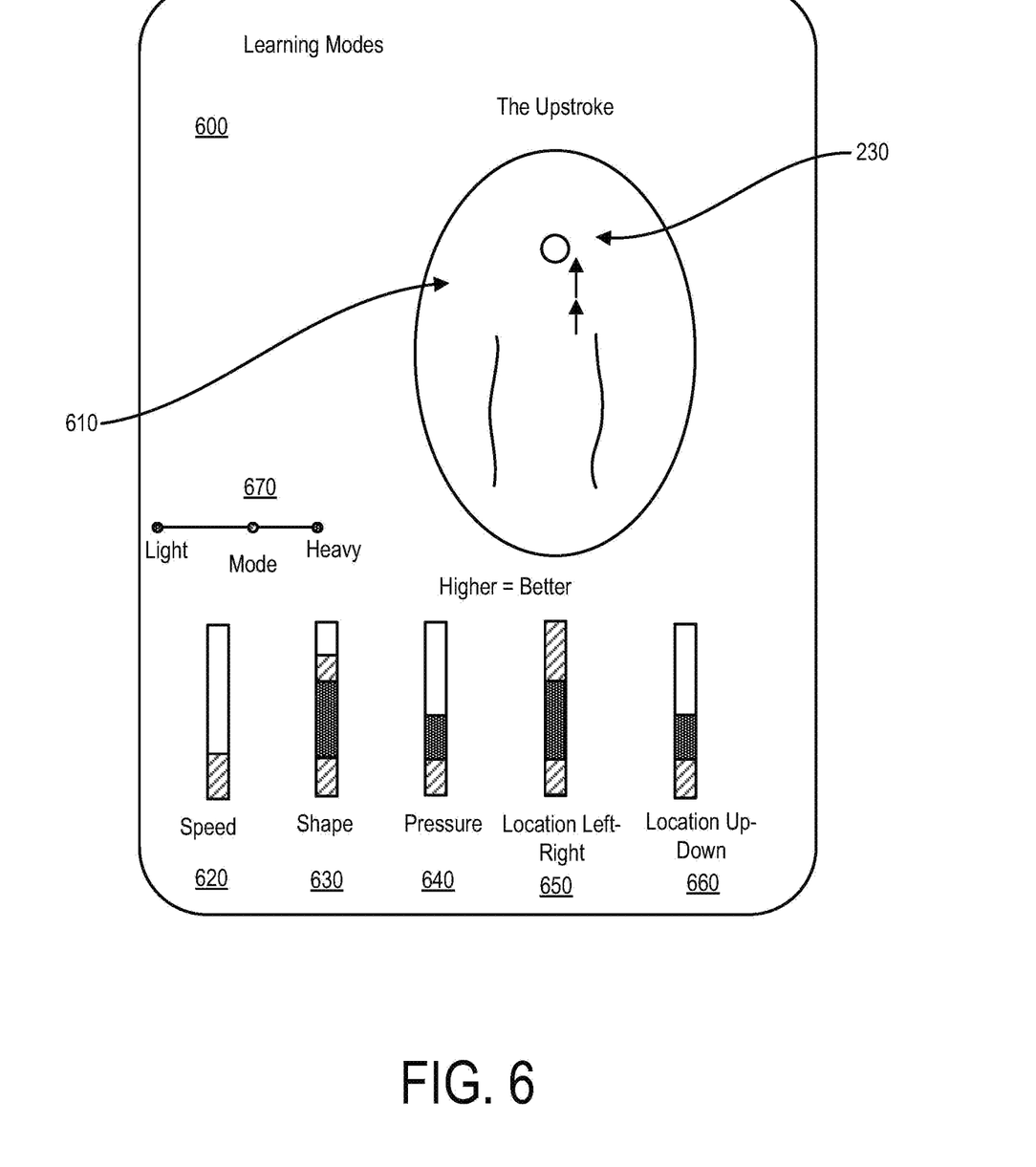
FIG. 6 is a screen layout example for a smartphone application for use in instructing users according to the present invention.

The upstroke is a pleasure technique where the pleasure provider moves their fingers or tongue along the pelvic area up to the clitoris. A screen 600 showing the training mode for performing this technique is depicted in FIG. 6.

The region shown at 610 is a graphical picture of the anatomical device (or the woman's genital area) with pre-programmed graphical representations of what movements to make, and where to make them. In this example, the user would apply pressure from their fingers or tongue upwards towards the clitoris 230 in the direction indicated by the arrows. Alternatively an instructional video, ebook, graphic or other means could be used to inform the user of the desired actions to perform this technique.

Also in this example, the user interface 600 shows the speed 620, shape 630, pressure 640 and location (left-right 650 and up-down 660) of the user's movement. It is noted that these items 620-660 may be sensed directly or computed from the sensor values, as is known in the art.

The screen 600 may also show the user how accurately the technique was performed with bar graphs shown in the boxes 620-660. In the example shown, the more accurate match with the prestored technique will result in higher bars in each bar graph 620-660. Mode 670 lets the user adjust the intensity of combination of speed and pressure from light to heavy.

Alternatively, or in conjunction with the bar graph, an audio signal may be used. This may be a female's voice providing corrective tips, such as for speed (too fast or too slow), shape (narrower, wider), pressure (too hard, too soft), and location (move left, move right).

The woman's voice could additionally provide nonverbal clues, such as moaning in different volume levels depending on the user's accuracy.

By storing a number of well-known sexual techniques applicable to pleasing a women, and measuring a user's attempts to recreate the techniques, the present invention educates pleasure providers to enable them to sexually gratify their female partners. Not only do the sensors measure contact within the simulated pelvic cavity, but they also cover its surface enabling the pleasure provider to learn non-penetrative techniques.

The sexual techniques may be based on those currently known (such as "the upstroke"), or programmed in a learning mode. In such a mode, the user (preferably a woman), enters the pattern of touches, pressures and speeds etc. into the smartphone application, which then stores the entries as a new sexual technique. If the woman knows a method that causes her to orgasm, she can directly enter the method to enable her partner to practice and recreate it on the anatomical device, and eventually upon her.

Figure 7:
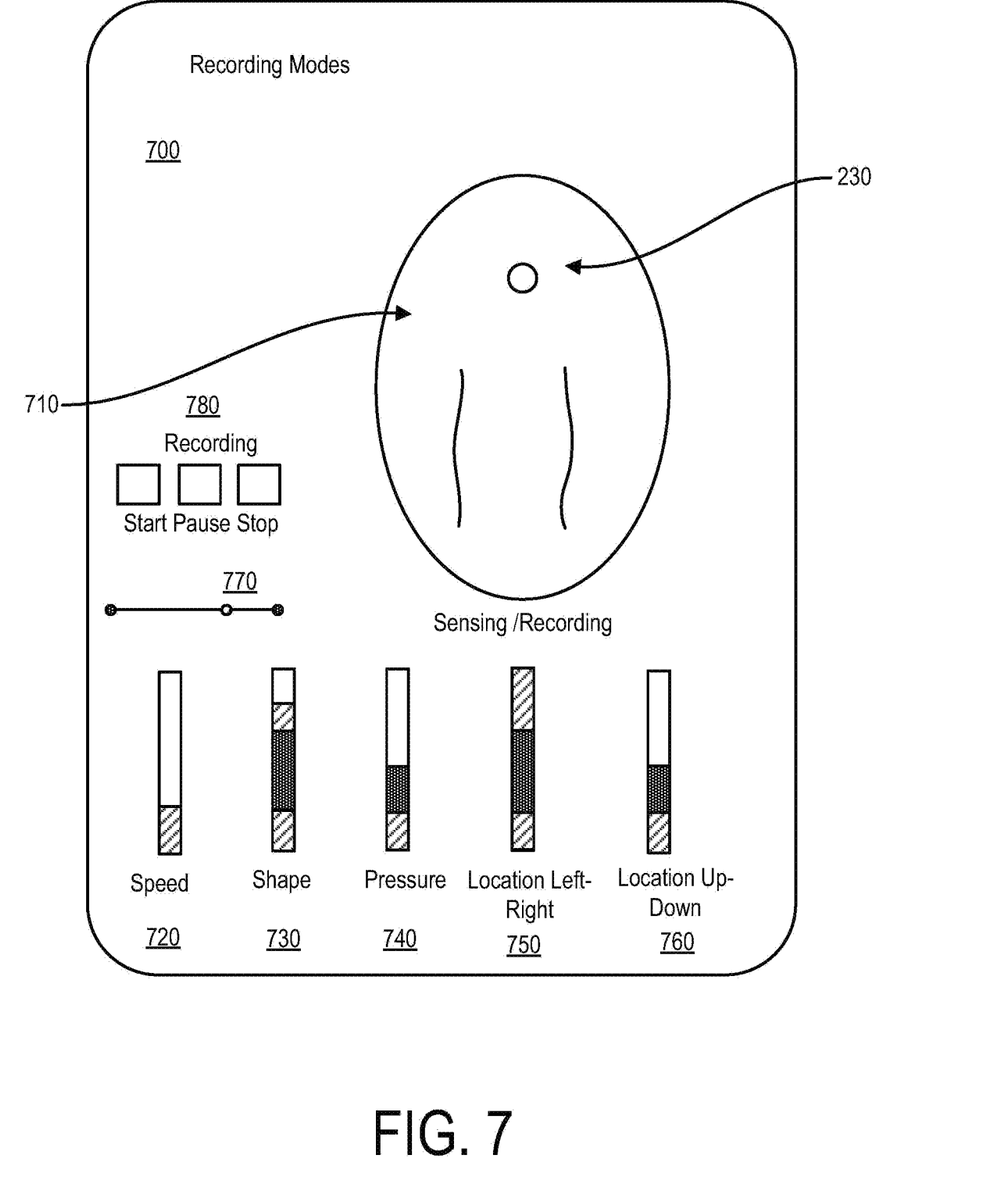
FIG. 7 is a screen layout example how the user's movements are sensed with the option to record for later playback and teaching.

A screen for this is shown in FIG. 7. Screen 700 shows the learning modes or recording modes screen where the device senses and optionally records the location and movements with on-screen indicators for the speed (720), shape (730), pressure (740), location left-right (750) and for up-down (760) as well as location on the device (710). The actions can be recorded via Start, Pause, and Stop icons (780).

The above description is not intended to be limiting, as many variations and embodiments are possible.

We claim:

1. A device for sexual education comprising:
   an anatomical device, having the shape of the pelvic sexual areas of a woman including
   (a) a vaginal and vulva area, having sensors disposed thereon, wherein at least some of the sensors are located in regions corresponding to the cervix, labias, vaginal opening, inside walls, A, G, P, K, O, and C-spots;
   (b) the sensors providing output to a processing board;
   (c) the processing board containing electronics which receive the senor output and processes the output;
   (d) the processing board further having a communication circuit to communicate the processed output to an external device.

2. A device according to claim 1 wherein the anatomical device is further shaped as a life-size replica of a woman's pelvic area and is made of one or more of a silicone material, a ThermoPlastic Elastomer (TPE), or a Liquid Silicone Rubber (LSR).

3. A device according to claim 1 wherein the anatomical device replicates the area of a woman between the legs with an opening where the vagina is located.

4. A device according to claim 1 wherein the anatomical device replicates the area of a woman around and inside the anus.

5. A device according to claim 1 wherein the anatomical devices includes sensors disposed in the following regions: vulva, vagina, labia majora, labia minora, hymen, perineum, urethra, clitoris, cervix, inside walls, A-spot, O-spot.

6. A device according to claim 1 further comprising leg extensions from the pelvic area.

7. A device according to claim 6 further comprising: a set of sensors integrated into the device covering the inside and outside areas of the vagina including the inside and outside of the legs.

8. A device according to claim 1 wherein at least some of the sensors are located in regions corresponding to the inside and outside of the anus.

9. A device according to claim 1 where the number of sensors are between 10 and 50, inclusive.

10. A device according to claim 1 further comprising: a set of sensors detecting touch or proximity of fingers or the tongue.

11. A device according to claim 1 further comprising: a set of sensors detecting location, movement, speed, intensity of the touch or proximity.

12. A device according to claim 1 further comprising: a set of sensors based on resistive or capacitive technology.

13. A device according to claim 1 further comprising: a set of analog sensors changing the resistance or capacitance based on strength of pressure applied.

14. A device according to claim 1 wherein the sensors are: pressure sensors molded into silicone-like material with the wires routed to the signal processing board.

15. A system according to claim 1 wherein the processing board contains a set of electronics components which process the sensor signals, digitize the processed sensor signals, and digitally process digitized signals.

16. A system according to claim 1 wherein the processing board contains: a Field Programmable Gate Array (FPGA).

17. A system according to claim 1 wherein the communication circuit further comprises module configured for wireless communication.

18. A method to teach a user techniques to sexually satisfy a woman, comprising the steps of:
- (a) storing data relating to sexual techniques of pleasuring a woman in a computing device;
- (b) presenting information related to a specific sexual technique to a user,
- (c) sensing touches of the user in an anatomical device shaped to resemble a woman's pelvic area, wherein the touches are sensed in regions of the anatomical device that correlate to sexually sensitive regions of a woman's pelvic area;
- (d) converting the sensed touches to digital data;
- (e) communicating data relating to the sensed touches to the computing device, wirelessly;
- (f) comparing the communicated data with the stored data in the computing device to determine how close the sensed touches relate to the specific sexual technique;
- (g) indicating, on the computing device, the accuracy of the comparison as well corrections as to how the user may more closely achieve the specific sexual technique by informing the user to alter at least one of the following: speed, pressure and location.

* * * * *